United States Patent Office

3,546,002
Patented Dec. 8, 1970

3,546,002
PROCESS OF APPLYING BLENDED UNSATURATED ACID ESTERIFIED COPOLYMER SURFACE COATINGS INCLUDING CROSSLINKING THE BLENDED COPOLYMERS WITH IONIZING RADIATION
Sol B. Radlove, Chicago, and Abraham Ravve, Lincolnwood, Ill., assignors to Continental Can Company, Inc., New York, N.Y., a corporation of New York
No Drawing. Filed Aug. 7, 1968, Ser. No. 750,750
Int. Cl. C08f 1/24
U.S. Cl. 117—93.31         12 Claims

ABSTRACT OF THE DISCLOSURE

A process for coating articles wherein a polymerizable prepolymer blend of an unsaturated ester of a vinyl aromatic hydrocarbon unsaturated alcohol copolymer such as styrene/allyl alcohol copolymer and a polymerizable interpolymer ester such as an unsaturated ester of a styrene/hydroxyalkyl acrylate/alkyl acrylate terpolymer is applied to the surface of the article to be coated and the prepolymer blend polymerized to form the coating using ionizing radiation.

BACKGROUND OF INVENTION

Field of invention

This invention is related to the coating of articles such as metals, plastics, paper, and the like, and more particularly to organic coatings obtained by polymerizing unsaturated polymeric materials on the article surface using ionizing radiation.

The prior art

In the manufacture of containers from metal sheet, a protective organic coating is applied to the side of the metal sheet which is to form the interior of the container. The materials which are employed for coating the metal sheet are generally heat-curable, resinous materials which are applied in the form of a solution or dispersion in a volatile organic solvent. The wet-coated metal surface is passed through an oven in which hot air is circulated to evaporate the solvent and to cure the coating material to the required hardness. As this form of coating application is relatively slow, the art is continually seeking more rapid methods of increasing the speed of coating application.

Among the various methods which have been proposed to increase the speeds at which metal sheet can be coated is to apply a layer of suitable thickness of an ethylenically unsaturated monomer or mixture of monomers to the metal sheet surface whereupon the monomer layer is activated to interact and form a cured polymer coating by exposing the layer to a source of ionizing radiation. The activation action is carried out at ambient temperatures and, since the action of the ionizing radiation is extremely rapid, the monomer layer can be polymerized in a continuous flow movement across the source of irradiation. Since no evaporation of solvent is required, desirable polymeric coatings are obtained in relatively short periods of time.

Although a wide variety of ethylenically unsaturated monomeric compounds have been proopsed for use in forming polymeric coatings using ionizing radiation curing procedures, these compounds when exposed to a source of ionizing radiation do not always form hard, adherent, solvent-resistant coatings of the type which are required for can coatings.

SUMMARY OF THE INVENTION

In accordance with the present invention, there is provided a rapid method of preparing hard, adherent, polymeric coatings on articles and particularly metal substrates wherein there is applied to the article substrate a thin film of a homogenous blend of polymerizable esterified prepolymers, the esterified prepolymer blend being comprised of (A) an $\alpha,\beta$-ethylenically unsaturated carboxylic ester of a vinyl aromatic hydrocarbon/unsaturated alcohol copolymer and (B) an $\alpha,\beta$-ethylenically unsaturated ester of an interpolymer of (a) a vinyl aromatic hydrocarbon, (b) a hydroxyalkyl ester of an $\alpha,\beta$-ethylenically unsaturated carboxylic acid, and (c) an alkyl ester of an $\alpha,\beta$-ethylenically unsaturated carboxylic acid. The coated side of the substrate is exposed to a source of ionizing radiation for a time sufficient to effect the polymerization of the ester prepolymer blend and to convert the prepolymer blend into a continuous coating on the substrate.

The process of the present invention reduces the high cost of solvents and the time of the oven baking cycle which is currently used for producing metal surface coatings. The polymerized coating prepared by the process of the present invention contains no residual catalysts or other foreign substances enabling the coating to readily meet the purity standards required of coatings in the container field.

PREFERRED EMBODIMENTS

The $\alpha,\beta$-ethylenically unsaturated carboxylic acid used to prepare the polymerizable esterified vinyl aromatic hydrocarbon/unsaturated alcohol copolymer used in the process of the present invention is preferably an unsaturated carboxylic acid having 3 to 8 carbon atoms. Examples of such acids are acrylic acid, methacrylic acid, ethacrylic acid, itaconic acid, maleic acid, sorbic acid, and fumaric acid.

Vinyl aromatic hydrocarbon/unsaturated alcohol copolymers which may be esterified with the $\alpha,\beta$-ethylenically unsaturated carboxylic acid to prepare the polymerizable prepolymer ester is a copolymer of an ethylenically unsaturated alcohol having 2 to 6 carbon atoms such as allyl alcohol, methallyl alcohol, and the like, and a vinyl aromatic hydrocarbon monomer such as styrene, and ring substituted styrenes in which the substituents are 1 to 4 carbon atom alkyl groups or chlorine atoms such as ortho-, meta-, and para-, methyl, ethyl, butyl, etc., mono-alkyl styrenes; 2,3- and 2,4-dimethyl and diethyl styrenes; mono-, di-, and tri-chlorostyrenes; alkylchlorostyrenes, such as 2-methyl-4-chlorostyrene, etc. Mixtures of two or more of the styrene moieties may be present.

Styrene/allyl alcohol copolymers are commercially available. The copolymers generally have a styrene content of about 60% to about 85%, an alcohol content of about 15% to about 40%, and have an initial hydroxy group content, before esterification, of about 2% to 10% by weight. A particularly desirable commercially-available styrene/allyl alcohol copolymer which may be used to prepare the polymerizable esterified prepolymer is RJ–101 available from the Monsanto Company. RJ–101 is a styrene/allyl alcohol copolymer having a styrene content of about 60%, an available hydroxy content of 7.3% to 8%, a molecular weight of approximately 1700, and a softening temperature (ASTM E28–517) of 95° to 105° C.

The polymerizable vinyl aromatic hydrocarbon unsaturated alcohol copolymer ester prepolymer used in the process of the present invention may be prepared by heating a mixture composed of the copolymer and the $\alpha,\beta$-ethylenically unsaturated carboxylic acid in a suitable reaction vessel in the presence of a suitable condensation catalyst, such as $H_2SO_4$, p-toluene sulfonic acid, or hydroquinone, 2,5-disulfonic acid, and suitable solvents, such as benzene or toluene, at elevated temperatures ranging from about 70° to 120° C. for about one to about five hours at atmospheric pressure or under vacuum. During this condensation reaction, water is given off as a by-product and the ceasing of its evolution is a convenient determinant of the end of the reaction. After the completion of the reaction, the excess solvent is removed using conventional separation and vacuum distillation techniques.

The interpolymer which is used to form the polymerizable interpolymer ester contains about 15% to about 35% by weight of the vinyl aromatic hydrocarbon. Vinyl aromatic monomers which may be used to prepare the interpolymer include styrene, and ring-substituted styrenes similar to those previously mentioned to prepare the vinyl aromatic hydrocarbon/unsaturated alcohol copolymers.

The hydroxyalkyl ester component of the interpolymer is present in the interpolymer at a concentration range of about 15% to about 50% by weight. The hydroxyalkyl ester monomer may be any such ester, but especially preferred are alkylene glycol monoesters in which the alkylene moiety contains up to 6 carbon atoms, and particularly acrylic acid or methacrylic acid monoesters of ethylene glycol, 1,2-propylene glycol, 1,3-propylene glycol and 1,4-butylene glycol.

There may also be employed similar esters of other unsaturated acids, for example, those having 3 to about 8 carbon atoms, including unsaturated dicarboxylic acids, such as maleic, fumaric and itaconic acid (including in the term "acids" the anhydrides of those acids which form anhydrides).

The preferred hydroxyalkyl ester monomers used to prepare the interpolymer are $\beta$-hydroxyalkyl acrylates having the general formula:

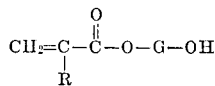

wherein R is a hydrogen atom or a methyl group and G is an alkylene group containing 2 to 6 carbon atoms. Representative examples of $\beta$-hydroxyalkyl acrylates suitable for the preparation of the interpolymer include hydroxyethyl acrylate and methacrylate, hydroxypropyl acrylate and methacrylate, and hydroxyhexyl acrylate and methacrylate.

The alkyl ester of an $\alpha,\beta$-ethylenically unsaturated carboxylic acid component of the interpolymer is present in the interpolymer in an amount ranging from about 30% to about 60% by weight based on the weight of the interpolymer.

The alkyl ester of an $\alpha,\beta$-ethylenically unsaturated carboxylic acid which may be used to prepare the interpolymer is preferably an alkyl acrylate having the general formula:

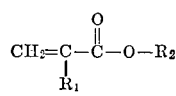

wherein $R_1$ is a hydrogen or methyl group and $R_2$ is an alkyl group having 6 to 10 carbon atoms.

Representative examples of suitable alkyl acrylates which are useful in the preparation of the interpolymer include hexyl acrylate and methacrylate, 2-ethylhexyl acrylate, and methacrylate and decyl acrylate and methacrylate.

The interpolymer is prepared from the above monomers using conditions and catalysts conventionally employed in making acrylate and methacrylate polymers. Thus, for example, the interpolymer may be prepared by mixing the monomer components in a volatile inert, organic solvent, and then adding a catalytic amount of a peroxide type catalyst. The resultant reaction mixture is polymerized at a temperature of approximately 100° to 110° C. for 1 to 3 hours in an inert atmosphere, e.g., nitrogen.

Various peroxide type catalysts may be used in the polymerization reaction, such as benzoyl peroxide, cumene hydroperoxide, tertiary butyl peroxide, tertiary butyl perbenzoate, and methyl ethyl ketone peroxide.

The polymerizable interpolymer ester prepolymer is prepared by reacting the interpolymer with an $\alpha,\beta$-ethylenically unsaturated carboxylic acid in much the same manner as the polymerizable vinyl aromatic hydrocarbon/unsaturated alcohol ester prepolymer is prepared, i.e., esterification in the presence of a condensation catalyst, such as $H_2SO_4$ at 70° to 120° C. for 1 to 5 hours with removal of water. The $\alpha,\beta$-ethylenically unsaturated carboxylic acids used to prepare the interpolymer ester are also generally the same as those used to prepare the vinyl aromatic hydrocarbon/unsaturated alcohol ester prepolymer, e.g., unsaturated carboxylic acids having 3 to 8 carbon atoms such as acrylic, methacrylic and the like.

The coating formulations are prepared by mixing the vinyl aromatic hydrocarbon/unsaturated alcohol ester prepolymer and interpolymer ester prepolymer at weight ratios of vinyl aromatic hydrocarbon/unsaturated alcohol copolymer ester to interpolymer ester of 1:1 to 2:1.

To effect the polymerization of the blend of the polymerizable copolymer ester prepolymer and interpolymer ester, a film of the blend is irradiated with a source of ionizing radiation, such as ultraviolet light or a beam of high energy electrons. The source of ultraviolet light is suitable emitted from an artificial source having a wave length in the range between 4000 A. and 1800 A., the irradiation being of an intensity of at least 100 watts/inch. An exposure time to the ultraviolet light source of about 1 to 3 seconds is required to effect polymerization.

Low pressure mercury vapor discharge tubes in quartz are the preferred source of ultraviolet light. Low pressure mercury vapor discharge tubes in glass and high-pressure mercury vapor discharge tubes in quartz or glass may be employed if desired.

Irradiation with ultraviolet light or wavelength below 2600 A. is preferred. When the polymerizable blend film is irradiated with ultraviolet light of wavelength below 2600 A., the intensity of the irradiation should be between about 100 to about 1800 watt/in for an exposure time of about 1 to 3 seconds. Generally, the source of irradiation is positions ¼ to 1½ inches from the polymerizable film surface.

As regards any particular conditions of source and distance, the duration of the irradiation treatment can be determined by a few trials.

High energy electrons used to effect the polymerization of the polymerizable prepolymer blend composition are obtainable from beams of high energy electrons produced by high voltage electron accelerators. There are several well-known types of electron accelerators available for this purpose. For example, the Van de Graaff electrostatic accelerator, resonant transformers, transformer-rectifiers, impulse of capacitrons, microwave waveguide linear accelerators, betratrons and synchrotrons. The Van de Graaff type generator and the transformer-rectifiers produce electron beams in continuous streams, while the other generators mentioned produce the beams in pulses. The electrons in the beams produced by any of these generators ordinarily possess energy exceeding 100,000 electron volts.

The dosage of the irradiation produced by these electron beams is measured in terms of the quantity of energy absorbed by the material irradiated. The "rad" is the unit of absorbed dose. In radiation dosimetry, a megarad is defined as a dose of irradiation producing an energy absorption of 100 million ergs per gram of absorbent material irradiated.

In order to effect polymerization of the polymerizable ester prepolymer-blend composition, by irradiation with high energy electrons in accordance with the process of the present invention, a dosage level within the range of about 0.1 megarad to about 10.0 megarads has been found to be satisfactory. The particular dosage level required in each case is dependent upon the thickness and the density of the particular prepolymer blend being irradiated.

The electron beam polymerization of the prepolymer blend film is inhibited by the presence of air, and therefore, it is preferred to exclude air from the reaction zone and perform the irradiation of the prepolymer in a vacuum or in an inert atmosphere such as nitrogen.

In coating metal substrates in accordance with the process of the present invention, the blend of the polymerizable vinyl aromatic hydrocarbon/unsaturated alcohol ester prepolymer and polymerizable interpolymer ester is applied to the substrate in the form of a liquid solution in any convenient manner as by spraying, dipping, roll coating, and the like.

As these polymerizable prepolymers may not always be of a viscosity suitable for application by the above methods, polymerizable monomers which are compatible and form homogenous mixtures with the prepolymers may be blended with the prepolymers. Suitable compatible polymerizable monomer diluents for the polymerizable prepolymer blend compositions include ethylenically unsaturated monomers such as vinyl aromatic hydrocarbons, such as styrene, vinyl toluene, or alpha-methyl styrene and the like, alkyl acrylates such as methyl acrylate and methacrylate, ethyl acrylate and methacrylate, propyl acrylate and methacrylate, isobutyl acrylate and methacrylate, 2-ethylhexyl acrylate and methacrylate, and vinyl esters such as vinyl acetate, vinyl propionate, and higher homologues thereof. In preparing mixtures of the polymerizable prepolymers with polymerizable monomer diluents, the diluted mixture contains about 10% to about 70% by weight of the monomer diluent, about 10% to about 50% by weight of the vinyl aromatic hydrocarbon/unsaturated alcohol copolymer ester prepolymer, and about 10% to about 30% by weight of the interpolymer ester prepolymer. Preferably such mixtures contain about 30% to about 50% of the monomer diluent, about 20% to about 40% by weight of the vinyl aromatic hydrocarbon/unsaturated alcohol copolymer ester prepolymer, and about 10% to about 20% by weight of the interpolymer ester prepolymer.

In addition to these polymerizable monomers, the polymerizable prepolymer blend composition for use in this invention may also contain fillers, dyes, pigments, and the like, provided that these materials do not affect or prevent the polymerization of the prepolymer blend composition contained in these mixtures.

In coating metal surfaces in accordance with the process of the present invention, a thin film of the polymerizable prepolymer blend composition is applied on the substrate to be coated, generally in the form of a sheet, which is positioned to travel on a conveyor and pass under a source of an irradiation beam. In most instances, the irradiation source is maintained at about ½ to 4 inches from the substrate undergoing irradiation, but this is not especially critical.

The preferred coating weight for coating metal sheet substrates with an adequately protective organic coating suitable for use in container manufacture is in the range of 1.0 to 15.0 milligrams of polymerized coating per square inch of substrate surface. To obtain these coating weights, the liquid solution of polymerizable ester prepolymer is applied at a coating thickness of about 0.2 to 1.5 mils, which thickness is sufficient to permit adequate penetration by the ionizing radiation to effect the polymerization of prepolymer blend composition.

The present invention is illustrated, but not limited, by the following examples.

EXAMPLE I (A) Preparation of a styrene/allyl alcohol copolymer-acrylic acid ester prepolymer.—To a 1 liter round bottom flask containing 300 ml. benzene and equipped with a condenser, stirrer, $N_2$ gas inlet and outlet, and a Barrett trap were charged the following reactants:

|   | Grams |
|---|---|
| RJ-101 | 150 |
| Glacial acrylic acid | 50 |
| $H_2SO_4$ (50%) | 4.0 |
| Hydroquinone | 0.5 |

The temperature of the reaction mixture was raised to 70° to 80° C. and the mixture heated for 4.5 hours and the effluent water (12.5 grams) collected. The reaction mixture was passed through an ion-exchange column (Rohm & Haas Amberylst A-21) to remove the free acids. After two hours, the acid value was 6.2. The reaction mixture was dried and stripped of benzene under vacuum at 50° to 56° C. The reaction product was a viscous liquid having a dark orange color.

(B) Preparation of a styrene/2-ethylhexyl acrylate/hydroxyethyl methacrylate interpolymer-acrylic acid ester prepolymer.—To a 1 liter, 3-necked, flask fitted with a stirrer, thermometer, nitrogen inlet and outlet, condenser, and dropping funnel, was placed 60 grams of toluene. The toluene under $N_2$ was heated to 100° to 110° C., and a solution of the following monomeric materials added:

| Monomer charge— | Grams |
|---|---|
| Styrene | 75 |
| 2-ethylhexyl acrylate | 135 |
| Hydroxyethyl methacrylate | 90 |
| Benzoyl peroxide (catalyst) | 12 |
| $CBr_2$ (molecular weight control agent) | 9 |

The monomer components were slowly added over a 1.5 hour period, with stirring, under a nitrogen atmosphere. The reaction temperature was maintained at 110° C. After the addition of the monomers, the reaction mixture was further stirred and heated an additional 1.5 hour period, with the addition of an additional 1.0 gram of benzoyl peroxide each 0.5 hour.

The reaction mixture was then cooled and 50 grams of glacial acrylic acid, 1.0 gram of hydroquinone, 5.0 grams of a 60% $H_2SO_4$ solution and 200 ml. of benzene was added. Esterification was carried out by heating at 82° to 92° C. for 4 hours using a Barrett trap. Ten grams of water were collected.

The esterified reaction mixture was cooled and diluted with benzene and passed through a column of Amberlyst A-21 ion exchange resin. The ion exchange treated esterified reaction product had an acid value of 10.5.

The esterified reaction mixture was then vacuum distilled at 55° C. to remove the solvents. The resultant product was a medium dark, clear viscous liquid.

Ten parts of the polymerizable styrene/allyl alcohol copolymer-acrylic ester prepolymer (A) and 5 parts of styrene/2 - ethylhexyl acrylate-hydroxyethyl methacrylate interpolymer acrylic acid ester prepolymer (B) were mixed with 10 parts of styrene to form a compatible blend composition. The blend composition had a viscosity of about 200 centipoise/sec.

To a series of 5 x 3 inch steel plates was applied a 0.0005 inch thick film of the blend composition prepared above. The coated plates were irradiated in a nitrogen atmosphere with an electron beam at 300 million electron volts (m.e.v.) to a dosage of 2 megarads. The irradiated liquid prepolymer film was found to be a polymerized, hard, adherent coating.

The steel plates were fabricated into can ends and subjected to the following tests:

Flexibility

The ability of the coating to remain flexible and resist fracturing during the mechanical operations involved in container fabrication were observed by subjecting the coated can end to immersion in an acid copper sulfate solution for 5 minutes to observe the permeation of the copper sulfate through the films. The penetration of the solution with resultant deposition of copper on the substrate which appears as a stain is an indication of failure of the coating in the fabricatng operation.

Pasteurization

The coated end is placed in a container filled with water and subjected to pasteurization temperatures in agitated, heated water at 155° F. for 30 minutes. The film is then scored with a sharp instrument in the shape of an X. A piece of cellophane tape is pressed against the X score to determine whether the coating can be lifted from the metal substrate.

Solvent resistance

The coated end is contacted with methyl ethyl ketone to determine whether the coating softens or can be removed by the solvent.

The results of the tests indicated that in the flexibility test, no staining of the can end occurred. In the pasteurization test, the coating could not be lifted from the metal substrate. The solvent resistance test indicated that the coating was substantially unaffected by contact with methyl ethyl ketone.

By way of contrast, a thin film composed of a blend of 13 parts of the styrene/allyl alcohol copolymer acrylic acid ester prepolymer (A) and 10 parts styrene coated on a steel plate and polymerized with an electron beam at a dosage of 2 megarads was found to be a brittle coating which developed heavy staining when tested for flexibility By way of further contrast, a thin film composed of a blend of 13 parts of the styrene/2-ethylhexyl acrylate/hydroxyethyl methacrylate interpolymer-acrylic acid ester prepolymer (B) and 10 parts styrene coated on a steel plate and polymerized with an electron beam at a dosage of 2 megarads when exposed to pasteurization conditions was found to be readily removable by the application of cellophane tape to the scored film.

EXAMPLE II

The procedure of Example I was repeated with the exception that the coated plate was placed on a continuously moving conveyor whose speed could be adjusted to as to control the time of the irridiation under a stationary, high intensity, mercury vapor, ultraviolet quartz lamp emitting ultraviolet light at a peak wavelength of 2537 A. and an intensity of 100 watts/in. The conveyor was adjusted so that the coated plate traveled 0.75 inches under the surface of the ultraviolet lamp for an exposure time of about 1 second. The polymerized coating was hard, flexible, and strongly adherent to the steel plate.

What is claimed is:
1. A process for coating an article comprising the steps of:
    applying to the surface of the article to be coated a thin film of homogenous blend of polymerizable esterified prepolymers, the esterified prepolymer blend being comprised of:
        (A) an $\alpha,\beta$-ethylenically unsaturated carboxylic acid ester of a copolymer comprised of a vinyl aromatic hydrocarbon and an ethylenically unsaturated alcohol having 2 to 6 carbon atoms; and
        (B) an $\alpha,\beta$-ethylenically unsaturated carboxylic acid ester of an interpolymer of (a) a vinyl aromatic hydrocarbon; (b) a hydroxyalkyl ester of an $\alpha,\beta$-ethylenically unsaturated carboxylic acid having 3 to 8 carbon atoms; and (c) an alkyl ester of an $\alpha,\beta$-ethylenically unsaturated carboxylic acid having 3 to 8 carbon atoms;
and then:
    irradiating the film containing surface with a source of ionizing electrons to effect polymerization of the ester prepolymer blend to obtain the coated article.

2. The process of claim 1 wherein esterified prepolymer (A) is the acrylic acid ester of a styrene/allyl alcohol copolymer.

3. The process of claim 1 wherein the esterified prepolymer (B) contains about 15% to about 35% by weight of the vinyl aromatic hydrocarbon, about 15% to about 50% by weight of the hydroxyalkyl ester, and about 30% to about 60% by weight of the alkyl ester.

4. The processof claim 1 wherein the esterified prepolymer (B) is the acrylic acid ester of a styrene/hydroxyalkyl acrylate/alkyl acrylate terpolymer.

5. The process of claim 4 wherein the hydroxyalkyl acrylate is hydroxyethyl methacrylate.

6. The process of claim 4 wherein the alkyl acrylate is 2-ethylhexyl acrylate.

7. The process of claim 1 wherein the ratio of prepolymer (A) to prepolymer (B) in the polymerizable esterified prepolymer blend ranges from 1:1 to 2:1.

8. The process of claim 1 wherein the ester prepolymer blend film is polymerized with a beam of high energy electrons.

9: The process of claim 1 wherein the ester prepolymer blend film is polymerized with a source of ultraviolet light.

10. The process of claim 1 wherein the film thickness of the ester prepolymer blend ranges from 0.1 to 15 mils.

11. The process of claim 1 wherein the ester prepolymer blend is blended with a compatible ethylenically unsaturated monomer and irradiated.

12. The process of claim 11 wherein the ethylenically unsaturated monomer is styrene.

References Cited

UNITED STATES PATENTS 3,288,736   11/1966   Wright et al.     260—80.75X

FOREIGN PATENTS 656,961   1/1963   Canada     260—80.75

ALFRED L. LEAVITT, Primary Examiner

J. H. NEWSOME, Assistant Examiner

U.S. Cl. X.R.

117—161; 204—159.16, 159.22; 260—80.75, 901